United States Patent
Johnson et al.

(10) Patent No.: US 7,134,629 B2
(45) Date of Patent: Nov. 14, 2006

(54) STRUCTURAL PANELS FOR USE IN AIRCRAFT FUSELAGES AND OTHER STRUCTURES

(75) Inventors: Kent Johnson, Seattle, WA (US); Mark A. Ulvin, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/853,075

(22) Filed: May 25, 2004

(65) Prior Publication Data

US 2005/0263645 A1      Dec. 1, 2005

Related U.S. Application Data

(60) Provisional application No. 60/559,911, filed on Apr. 6, 2004.

(51) Int. Cl.
*B64C 1/00* (2006.01)

(52) U.S. Cl. .................................................. 244/119

(58) Field of Classification Search .......... 52/664–667, 52/796.12, 797.1, 198.1, 799.13; 244/117 R, 244/119, 123.12, 124, 129.1, 131–133
See application file for complete search history.

(56) References Cited

U.S. PATENT DOCUMENTS

| | | | | |
|---|---|---|---|---|
| 2,004 A | * | 3/1841 | Ua ................................ 440/90 |
| 2,292,372 A | * | 8/1942 | Gerlach et al. ............. 52/798.1 |
| 2,367,750 A | * | 1/1945 | Berkow et al. ........... 244/123.2 |
| 2,387,219 A | | 10/1945 | Neville |
| 2,992,711 A | * | 7/1961 | Mitchell et al. ......... 52/783.19 |
| 3,071,217 A | * | 1/1963 | Gould ........................ 52/403.1 |
| 3,452,501 A | * | 7/1969 | Sickler et al. ............. 52/798.1 |
| 3,507,634 A | * | 4/1970 | O'Driscoll ................... 428/573 |
| 3,879,245 A | | 4/1975 | Fetherson et al. |
| 3,976,269 A | * | 8/1976 | Gupta .......................... 244/119 |
| 3,995,080 A | * | 11/1976 | Cogburn et al. ........... 428/34.5 |
| 4,064,534 A | | 12/1977 | Chen et al. |
| 4,186,535 A | * | 2/1980 | Morton ......................... 52/250 |
| 4,310,132 A | | 1/1982 | Frosch |
| 4,490,958 A | * | 1/1985 | Lowe ............................ 52/634 |
| 4,548,017 A | * | 10/1985 | Blando ....................... 52/798.1 |

(Continued)

FOREIGN PATENT DOCUMENTS

DE          30 40 838          5/1982

(Continued)

OTHER PUBLICATIONS

U.S. Appl. No. 10/819,084, filed Apr. 2004, Tummire et al.

(Continued)

*Primary Examiner*—Michael J. Carone
*Assistant Examiner*—John A Radi
(74) *Attorney, Agent, or Firm*—Perkins Coie LLP

(57) ABSTRACT

Structural panels for use in manufacturing aircraft fuselages and other structures are disclosed herein. In one embodiment, a structural panel configured in accordance with the invention includes a skin and at least first and second stiffeners. The first stiffener can have a first flange portion mated to the skin and a first raised portion projecting away from the skin. The second stiffener can have a second flange portion mated to the skin and a second raised portion projecting away from the skin. At least one of the first flange portion of the first stiffener and the second flange portion of the second stiffener can extend toward the other of the first flange portion and the second flange portion to form an at least approximately continuous support surface to which a frame can be attached.

20 Claims, 6 Drawing Sheets

U.S. PATENT DOCUMENTS

| | | | |
|---|---|---|---|
| 4,548,859 A | 10/1985 | Kline | |
| 4,608,220 A | 8/1986 | Caldwell | |
| 4,631,221 A * | 12/1986 | Disselbeck et al. | 428/166 |
| 4,693,678 A | 9/1987 | Von Volkli | |
| 4,699,683 A | 10/1987 | Mc Cowin | |
| 4,715,560 A | 12/1987 | Loyek | |
| 4,736,566 A * | 4/1988 | Krotsch | 52/783.14 |
| 4,760,444 A | 7/1988 | Nielson | |
| 4,780,262 A | 10/1988 | Von Volkli | |
| 4,790,898 A | 12/1988 | Woods | |
| 4,830,298 A | 5/1989 | Van Blunk | |
| 4,877,471 A | 10/1989 | Mc Cowin | |
| 4,941,182 A | 7/1990 | Patel | |
| 5,024,399 A | 6/1991 | Barquet | |
| 5,058,497 A | 10/1991 | Bishop | |
| 5,223,067 A * | 6/1993 | Hamamoto et al. | 156/173 |
| 5,242,523 A | 9/1993 | Willden et al. | |
| 5,262,220 A * | 11/1993 | Spriggs et al. | 428/156 |
| 5,337,647 A | 8/1994 | Roberts | |
| 5,399,406 A * | 3/1995 | Matsuo et al. | 428/57 |
| 5,439,549 A | 8/1995 | Fryc | |
| 5,450,147 A | 9/1995 | Dorsey-Palmateer | |
| 5,518,208 A | 5/1996 | Roseburg | |
| 5,540,126 A | 7/1996 | Piramoon | |
| 5,562,788 A | 10/1996 | Kitson et al. | |
| 5,619,837 A * | 4/1997 | DiSanto | 52/798.1 |
| 5,622,733 A * | 4/1997 | Asher | 425/504 |
| 5,651,600 A | 7/1997 | Dorsey-Palmateer | |
| 5,683,646 A | 11/1997 | Reiling | |
| 5,700,337 A | 12/1997 | Jacobs | |
| 5,746,553 A | 5/1998 | Engwall | |
| 5,765,329 A * | 6/1998 | Huang | 52/302.3 |
| 5,804,276 A | 9/1998 | Jacobs | |
| 5,814,386 A | 9/1998 | Vasiliev | |
| 5,871,117 A | 2/1999 | Protasov | |
| 5,893,534 A * | 4/1999 | Watanabe | 244/119 |
| 5,954,917 A | 9/1999 | Jackson et al. | |
| 5,963,660 A | 10/1999 | Koontz | |
| 5,979,531 A | 11/1999 | Barr | |
| 6,012,883 A | 1/2000 | Engwall | |
| 6,013,341 A | 1/2000 | Medvedev | |
| 6,045,651 A | 4/2000 | Kline | |
| 6,074,716 A | 6/2000 | Tsotsis | |
| 6,086,696 A | 7/2000 | Gallagher | |
| 6,112,792 A | 9/2000 | Barr | |
| 6,114,012 A * | 9/2000 | Amaoka et al. | 428/182 |
| 6,168,358 B1 | 1/2001 | Engwall | |
| 6,187,411 B1 * | 2/2001 | Palmer | 428/102 |
| 6,205,239 B1 | 3/2001 | Lin | |
| 6,364,250 B1 | 4/2002 | Brinck | |
| 6,374,750 B1 * | 4/2002 | Early | 105/409 |
| 6,390,169 B1 | 5/2002 | Johnson | |
| 6,415,581 B1 * | 7/2002 | Shipman et al. | 52/798.1 |
| 6,451,152 B1 | 9/2002 | Holmes | |
| 6,480,271 B1 | 11/2002 | Cloud | |
| 6,508,909 B1 * | 1/2003 | Cerezo Pancorbo et al. | 156/306.6 |
| 6,511,570 B1 * | 1/2003 | Matsui | 156/245 |
| 6,613,258 B1 | 9/2003 | Maison et al. | |
| 6,648,273 B1 | 11/2003 | Anast | |
| 6,692,681 B1 * | 2/2004 | Lunde | 264/510 |
| 6,702,911 B1 * | 3/2004 | Toi et al. | 156/93 |
| 6,730,184 B1 * | 5/2004 | Kondo et al. | 156/221 |
| 6,766,984 B1 * | 7/2004 | Ochoa | 244/119 |
| 6,779,707 B1 * | 8/2004 | Dracup et al. | 228/112.1 |
| 6,786,452 B1 * | 9/2004 | Yamashita et al. | 244/123.1 |
| 6,799,619 B1 | 10/2004 | Holmes | |
| 6,802,931 B1 * | 10/2004 | Fujihira | 156/292 |
| 6,871,684 B1 | 3/2005 | Engelbart et al. | |
| 2001/0042186 A1 | 11/2001 | Iivonen et al. | |
| 2002/0141632 A1 | 10/2002 | Engelbart | |
| 2003/0080251 A1 | 5/2003 | Anast | |
| 2003/0145932 A1 * | 8/2003 | Holmes et al. | 156/64 |
| 2004/0021038 A1 | 2/2004 | Solanille et al. | |
| 2004/0031567 A1 | 2/2004 | Engelbart et al. | |
| 2004/0155148 A1 * | 8/2004 | Folkesson et al. | 244/119 |
| 2005/0025350 A1 | 2/2005 | Engelbart et al. | |
| 2005/0211840 A1 * | 9/2005 | Grether et al. | 244/119 |
| 2005/0224648 A1 * | 10/2005 | Grether et al. | 244/118.5 |
| 2005/0263645 A1 * | 12/2005 | Johnson et al. | 244/119 |

FOREIGN PATENT DOCUMENTS

| | | |
|---|---|---|
| DE | 33 31 494 | 3/1985 |
| EP | 0 319 797 | 6/1989 |
| EP | 0 833 146 | 9/1997 |
| EP | 1 149 687 | 10/2001 |

OTHER PUBLICATIONS

U.S. Appl. No. 10/851,381, filed May 2004, Biomstad et al.
U.S. Appl. No. 10/949,848, filed Sep. 2004, Stulc.
U.S. Appl. No. 60/559,890, filed Apr. 2004, Biomstad et al.
U.S. Appl. No. 60/559,911, filed Apr. 2004, Johnson et al.
PCT International Search Report and Written Opinion for PCT/US2005/010336; dated Nov. 30, 2005, 10 pgs.
U.S. Appl. No. 10/822,538, filed Apr. 2004, Engelbart et al.
U.S. Appl. No. 10/846,974, filed May 2004, Engelbart et al.
Grimshaw, Michael N., et al. "Advanced Technology Tape Laying for Affordable Manufacturing of Large Composite Structures," (11 pgs); http://www.cinmach.com/tech/pdf/TapeLayingGrimshaw.pdf.
Grimshaw, Michael J., "Automated Tape Laying," (6 pgs); http://www.cinmach.com/tech/pdf/Grimshaw%20ASM%20Handbook.pdf.
International Search Report and Written Opinion for PCT/US2004/039905; Applicant: The Boeing Company; May 25, 2005; 10 pgs.
Prof. J. Zhang: "Angewandte Sensorik" CH 4. Sensoren In Der Robotik, Nov. 11, 2003, pp. 76-113; XP002327793; URL:http://tech-www.informatik.uni-hamburg.de/lehre/ws2003/vorlesungen/angewandte_sensorik/vorlesung_03.pdf, accessed Apr. 2004.
U.S. Appl. No. 09/819,022, filed Mar. 2001, Engelbart et al.
U.S. Appl. No. 10/068,735, filed Feb. 2002, Engelbart et al.
U.S. Appl. No. 10/217,805, filed Aug. 2002, Engelbart et al.
U.S. Appl. No. 10/301,949, filed Nov. 2002, Nelson.
U.S. Appl. No. 10/628,691, filed Jul. 2003, Engelbart et al.
U.S. Appl. No. 10/630,594, filed Jul. 2003, Braun.
U.S. Appl. No. 10/646,316, filed Aug. 2003, Engelbart et al.
U.S. Appl. No. 10/646,392, filed Aug. 2003, Engwall et al.
U.S. Appl. No. 10/646,509, filed Aug. 2003, Johnson et al.
U.S. Appl. No. 10/664,148, filed Sep. 2003, Engelbart et al.
U.S. Appl. No. 10/717,030, filed Nov. 2003, Johnson et al.
U.S. Appl. No. 10/726,099, filed Dec. 2003, Engelbart et al.
U.S. Appl. No. 10/799,306, filed Mar. 2004, Engelbart et al.
Systems and Methods for Using Light to Indicate Defect Locations on a Composite Structure, (51 pgs), filed Apr. 12, 2004.
http://www.cinmach.com/WolfTracks4_1/Mtg_WT7.Html; Premier 1 Features Lighter, Stronger All Composite Fuselage, 3 pgs.
BAe 146, FLIGHT International, May 2, 1981.
The Barrelful of Experience, Intervia, May 1992, 2 pgs.
Raytheon Aircraft Orders Four More Fiber Cincinnati Fiber Placement System for Industry's First Composite-Fuselage Business Jets, http://www.cinmach.com/compnews/PressReleases/pr00-11.htm [accessed Mar. 25, 2004].
Raytheon, Mar. 2000, vol. 4, No. 2, http://www.cts.com/king/vasci/newsletter/vol42.html [accessed Mar. 1, 2004].
Beechcraft's Composite Challange, http://www.aerotalk.com/Beech.cfm [accessed Mar. 1, 2004].
Evans, Don O., "Fiber Placement", 3 pgs, Cincinnati Machine, no date available.
Business Aviation, Jun. 7, 2002, http://www.aviationnow.com/avnow/news/channel_busav.jsp?view=story&id=news/btoyo0607.xml [accessed Mar. 1, 2004].
Rocky Mountain Composites, http://www.rockymountaincomposites.com/wind_sys.htm [accessed Feb. 28, 2004].

Premier I Feature Lighter, Stronger All-Composite Fuselage, WolfTracks, vol. 4, No. 1, http://www.cinmach.com/wolfTracks4_1/MTG_WT7.htm [accessed Mar. 25, 2004].

CASA, SAMPE Journal, vol. 39, No. 1, Jan./Feb. 2003, p. 60.

Sharp et al; "Material Selection/Fabrication Issues for Thermoplastic Fiber Placement", Journal of Thermosplastic Composite Materials, vol. 8; Jan. 1995, pp. 2-14.

http://www.rockymountaincomposite.com/wind_sys.html; Filament Winding 2 pgs.

Fiedler, L. et al. "TANGO Composite Fuselage Platform", SAMPE Journal, vol. 39, No. 1, Jan. 2003.

http://www.cinmach.com/compnews/PressReleases/pro00-11.html; Raytheon Aircraft Orders Four More Fiber Cincinnati Fiber Placement Systems for Industry's First Composite-Fuselage Business Jets, 2 pgs.

* cited by examiner

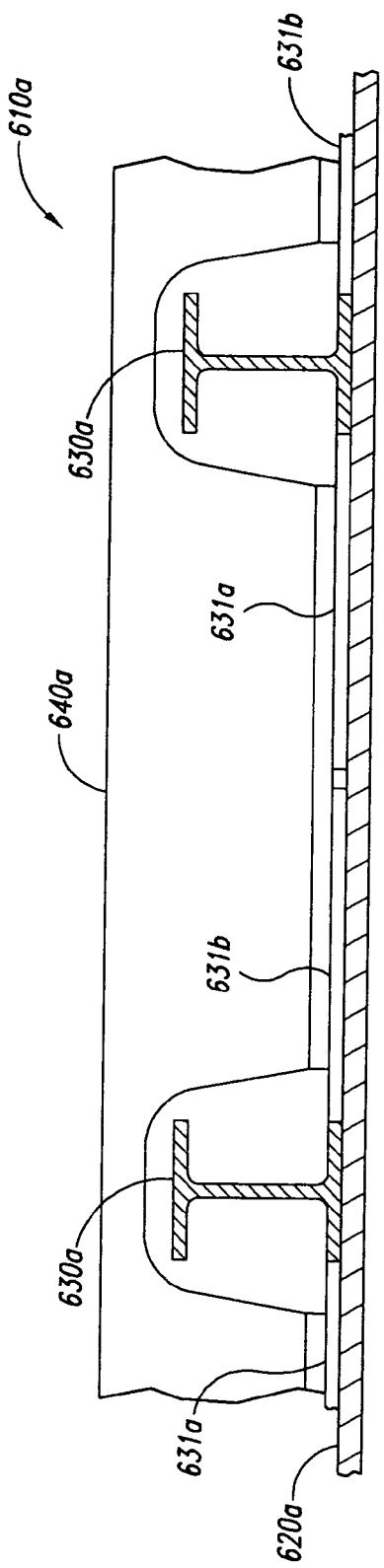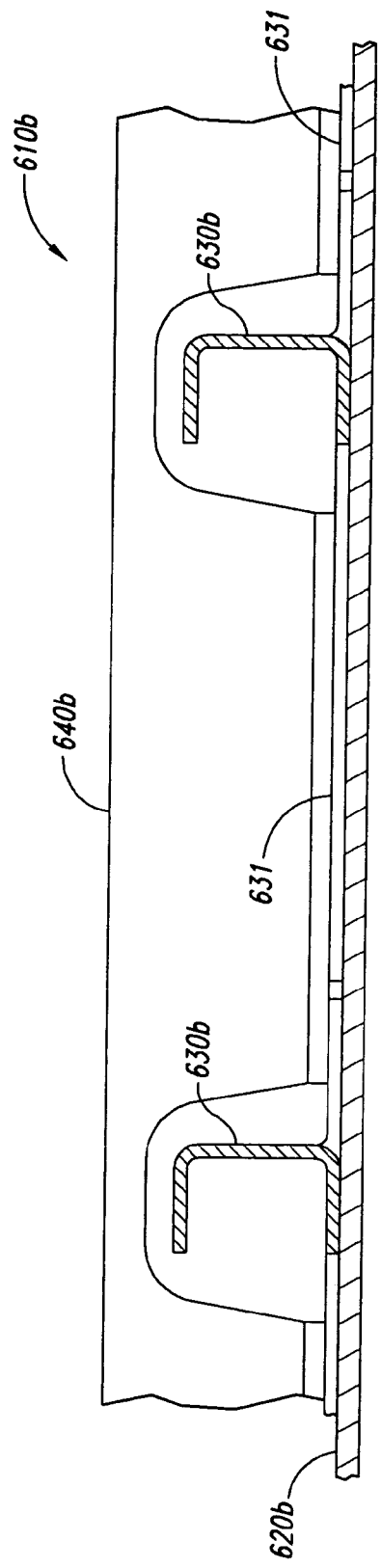
Fig. 6A
Fig. 6B

STRUCTURAL PANELS FOR USE IN AIRCRAFT FUSELAGES AND OTHER STRUCTURES

CROSS-REFERENCE TO RELATED APPLICATION

The present application claims priority to copending U.S. Provisional Patent Application No. 60/559,911, entitled "STRUCTURAL PANELS FOR USE IN AIRCRAFT FUSELAGES AND OTHER STRUCTURES," filed Apr. 6, 2004, and incorporated herein in its entirety by reference.

TECHNICAL FIELD

The following disclosure relates generally to structural panels and, more particularly, to structural panels for use in aircraft fuselages and other structures.

BACKGROUND

Aircraft manufacturers continually strive for ways to increase aircraft performance and reduce manufacturing costs. One well-known method for increasing aircraft performance is to reduce airframe weight through the use of state-of-the-art materials, such as composites, having relatively high strength-to-weight ratios. Conventional methods for manufacturing airframes with composite materials, however, often require relatively expensive tooling and labor-intensive assembly procedures.

FIG. 1 is an isometric view of a metal aircraft panel 100 configured in accordance with the prior art. The panel 100 includes a frame 106 and a plurality of stringers 104 attached to a skin 102 in a "semi-monocoque" configuration. The stringers 104 are "hat-section" stringers having a raised portion 103 and opposing flange portions 105. The flange portions 105 are attached directly to the skin 102.

The frame 106 includes a first frame section 107 and a second frame section 108. The first frame section 107 includes a base portion 109 and an upstanding leg portion 110. The upstanding leg portion 110 is fastened to the second frame section 108, and includes a plurality of openings or "mouse holes" 114 through which the raised portions 103 of the stringers 104 extend. The base portion 109 is attached to the stringer flange portions 105 and the skin 102. The base portion 109 includes a plurality of steps or "joggles" 112 positioned just outboard of the stringer flange portions 105. The joggles 112 allow the base portion 109 to step off of the stringer flange portions 105 and onto the skin 102. This allows the base portion 109 to be fastened directly to the skin 102 between the stringers 104 without causing gaps or excessive preload between the base portion 109 and the skin 102.

One shortcoming of the prior art panel 100 is that it can be expensive to manufacture. Forming the joggles 112 in the first frame section 107, for example, adds additional cost when compared to a similar frame section without joggles. This is especially true if the first frame section 107 is manufactured from composite materials rather than metal, because forming joggles in composite materials typically requires special tooling and/or post-cure machining.

SUMMARY

The present invention is directed generally toward structural panels for use in manufacturing aircraft and other structures. A structural panel configured in accordance with one aspect of the invention includes a skin and at least first and second stiffeners. The first stiffener can have a first flange portion mated to the skin and a first raised portion projecting away from the skin. The second stiffener can be spaced apart from the first stiffener and can have a second flange portion mated to the skin and a second raised portion projecting away from the skin. The structural panel can further include a frame section having a base portion mated to the first flange portion of the first stiffener and the second flange portion of the second stiffener without being mated to the skin between the first raised portion of the first stiffener and the second raised portion of the second stiffener. In another aspect of the invention, at least one of the first flange portion of the first stiffener and the second flange portion of the second stiffener can extend toward the other to form an at least approximately continuous support surface extending between the first raised portion of the first stiffener and the second raised portion of the second stiffener.

An aircraft fuselage configured in accordance with another aspect of the invention includes a passenger cabin and a plurality of structural panels operably coupled together to form a portion of the passenger cabin. Individual structural panels can include a skin and at least first and second stiffeners. The first stiffener can have a first flange portion mated to the skin and a first raised portion projecting away from the skin. The second stiffener can be spaced apart from the first stiffener and can similarly include a second flange portion mated to the skin and a second raised portion projecting away from the skin. Individual structural panels can further include a frame section having a base portion mated to the first flange portion of the first stiffener and the second flange portion of the second stiffener without being mated to the skin between the first raised portion of the first stiffener and the second raised portion of the second stiffener.

A method for manufacturing a structural panel in accordance with a further aspect of the invention includes mating at least a first flange portion of a first stiffener to a skin, and mating at least a second flange portion of a second stiffener to the skin. The first stiffener can include a first raised portion projecting away from the skin, and the second stiffener can include a second raised portion projecting away from the skin. The method can further include mating a base portion of a frame to the first flange portion of the first stiffener and the second flange portion of the second stiffener without mating the base portion to the skin between the first raised portion of the first stiffener and the second raised portion of the second stiffener.

BRIEF DESCRIPTION OF THE DRAWINGS

FIGS. 6A and 6B are cross-sectional end views of portions of structural panels configured in accordance with other embodiments of the invention.

DETAILED DESCRIPTION

The following disclosure describes structural panels for use in manufacturing aircraft and other structures. Certain details are set forth in the following description and in FIGS. 2–6B to provide a thorough understanding of various embodiments of the invention. Other details describing well-known structures and systems often associated with aircraft structures and composite materials are not set forth in the following disclosure to avoid unnecessarily obscuring the description of the various embodiments of the invention.

Many of the details, dimensions, angles, and other features shown in the Figures are merely illustrative of particular embodiments of the invention. Accordingly, other embodiments can have other details, dimensions, angles, and features without departing from the spirit or scope of the present invention. In addition, further embodiments can be practiced without several of the details described below.

In the Figures, identical reference numbers identify identical or at least generally similar elements. To facilitate the discussion of any particular element, the most significant digit or digits of any reference number refer to the Figure in which that element is first introduced. For example, element 210 is first introduced and discussed with reference to FIG. 2.

Figure 1:
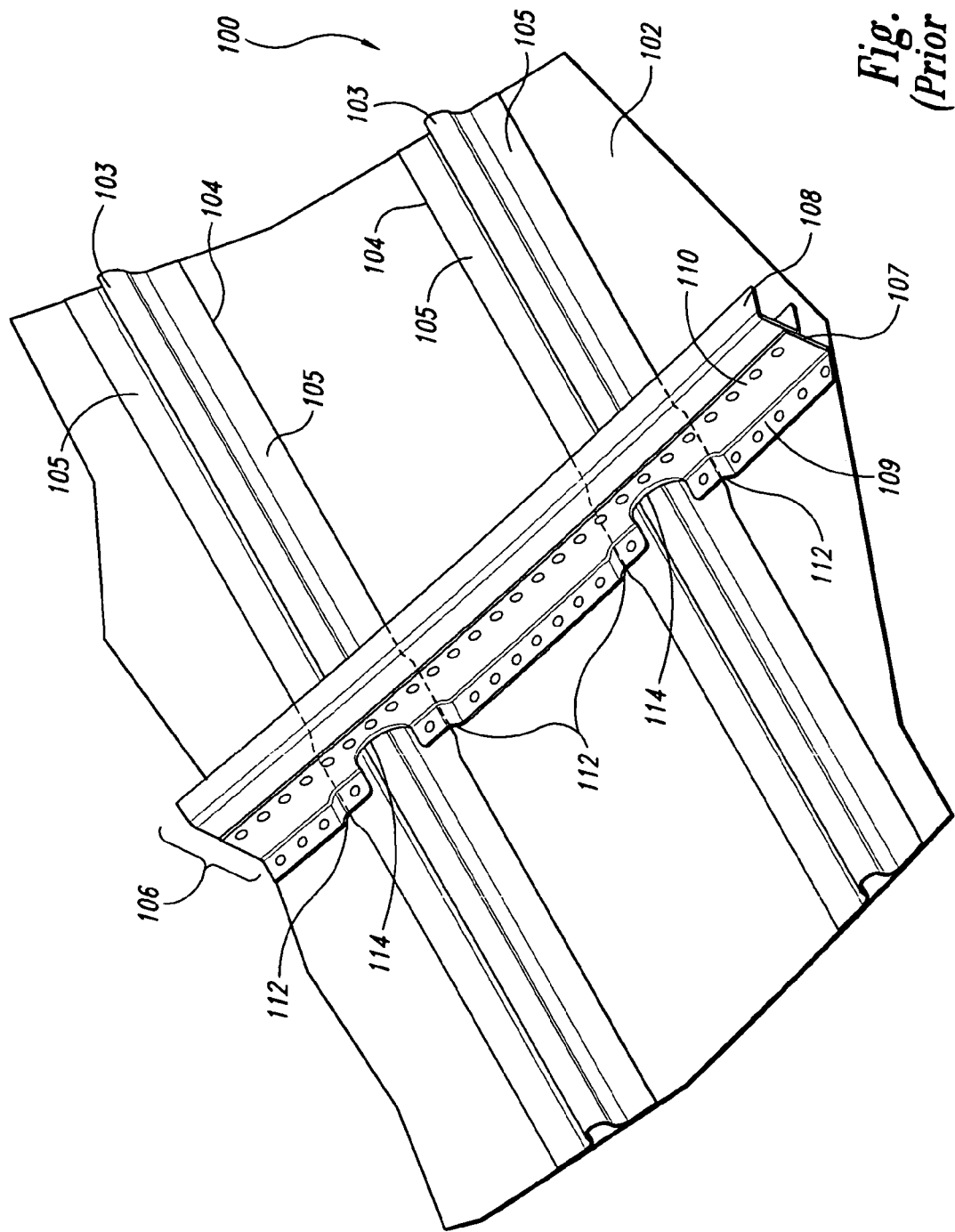
FIG. 1 is an isometric view of a metal aircraft panel configured in accordance with the prior art.
Figure 2:
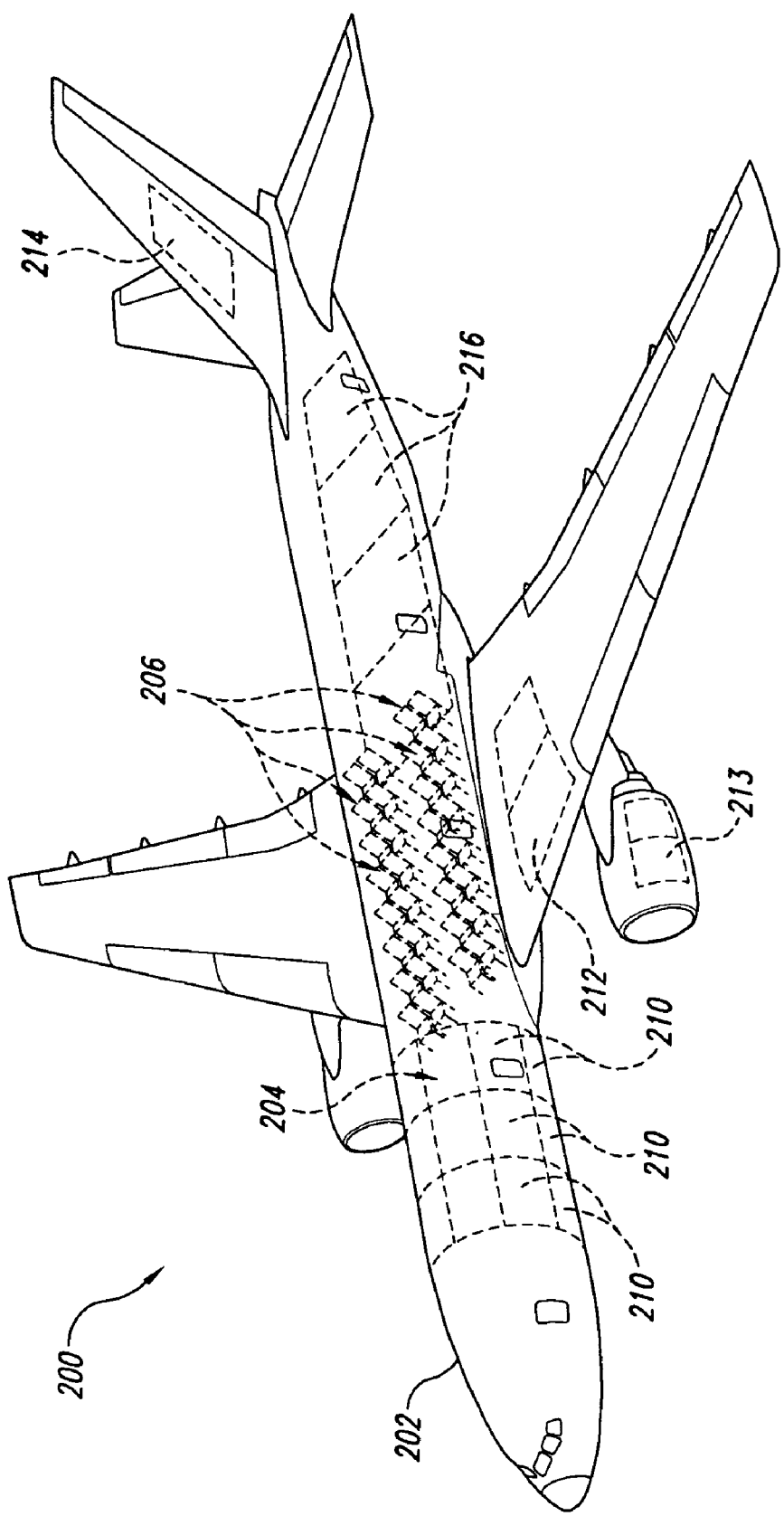
FIG. 2 is a partially hidden isometric view of an aircraft having a fuselage that includes a plurality of structural panels configured in accordance with an embodiment of the invention.

FIG. 2 is a partially hidden isometric view of an aircraft 200 having a fuselage 202 that includes a plurality of structural panels 210 configured in accordance with an embodiment of the invention. In one aspect of this embodiment, the structural panels 210 are operably coupled together to form an exterior portion of the fuselage 202 adjacent to a passenger cabin 204. The passenger cabin 204 can be configured to hold a plurality of passenger seats 206 ranging in number from about 50 to about 700 seats, e.g., from about 150 to about 600 seats. In another aspect of this embodiment described in greater detail below, the structural panels 210 can include one or more composite materials. In other embodiments, the structural panels 210 can be composed largely of metallic materials such as aluminum, titanium, and/or steel.

In a further aspect of this embodiment, the aircraft 200 can also include one or more wing panels 212, nacelle panels 213, and/or stabilizer panels 214. Each of the foregoing panels 212–214 can be at least generally similar in structure and function to the structural panel 210. Accordingly, the structural panels 210 or variations thereof may be used for portions of the aircraft 200 other than the fuselage 202. Further, use of such panels is not limited to exterior portions of the aircraft 200, but can extend to interior structural and/or nonstructural portions. For example, in one embodiment, the aircraft 200 can further include a plurality of floor panels 216 forming a floor portion of the passenger cabin 204. The floor panels 216 can be at least generally similar in structure and function to the structural panels 210.

Figure 3A:
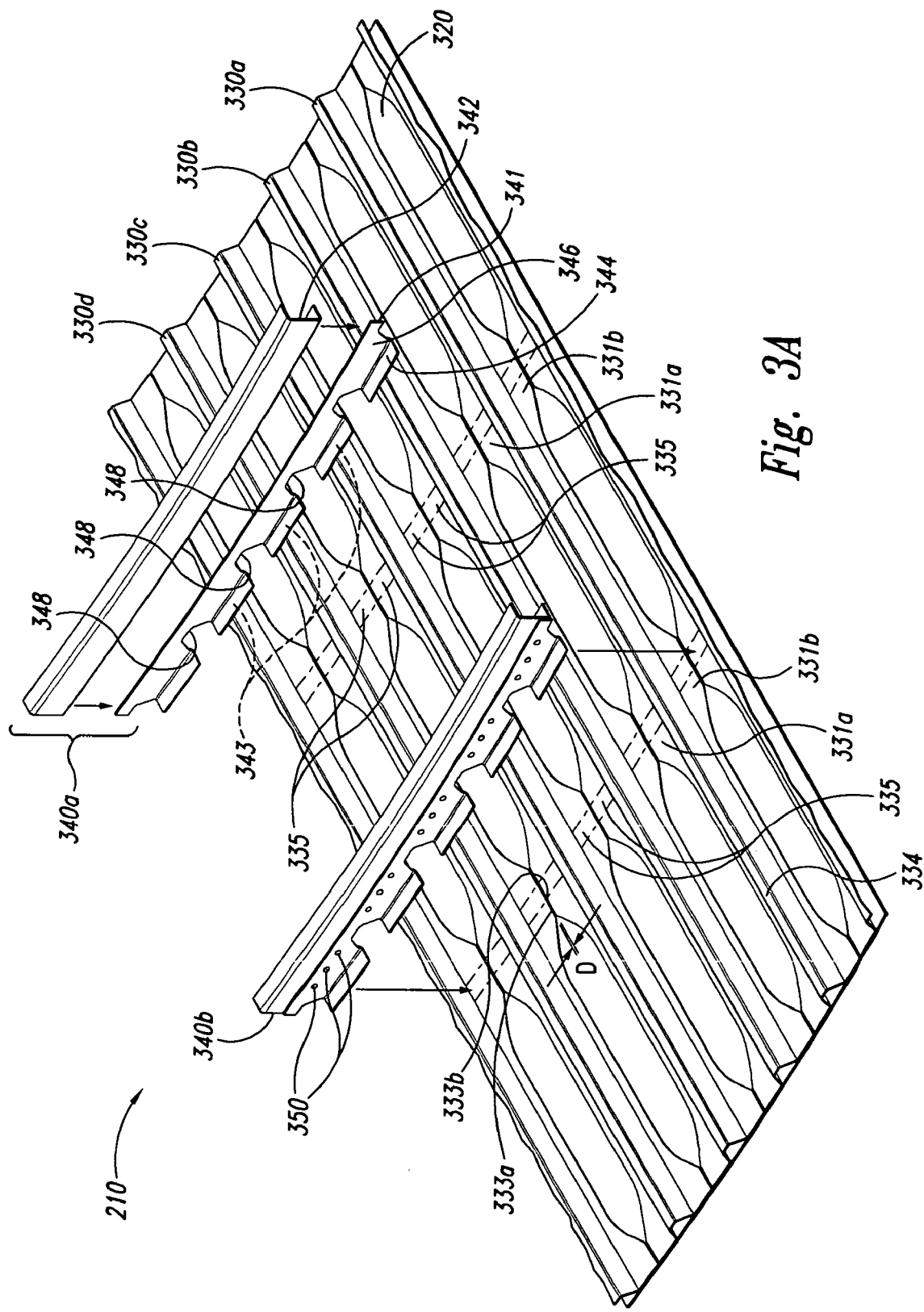
FIGS. 3A and 3B are a partially exploded isometric view and an assembled isometric view, respectively, of a structural panel configured in accordance with an embodiment of the invention.
Figure 3B:
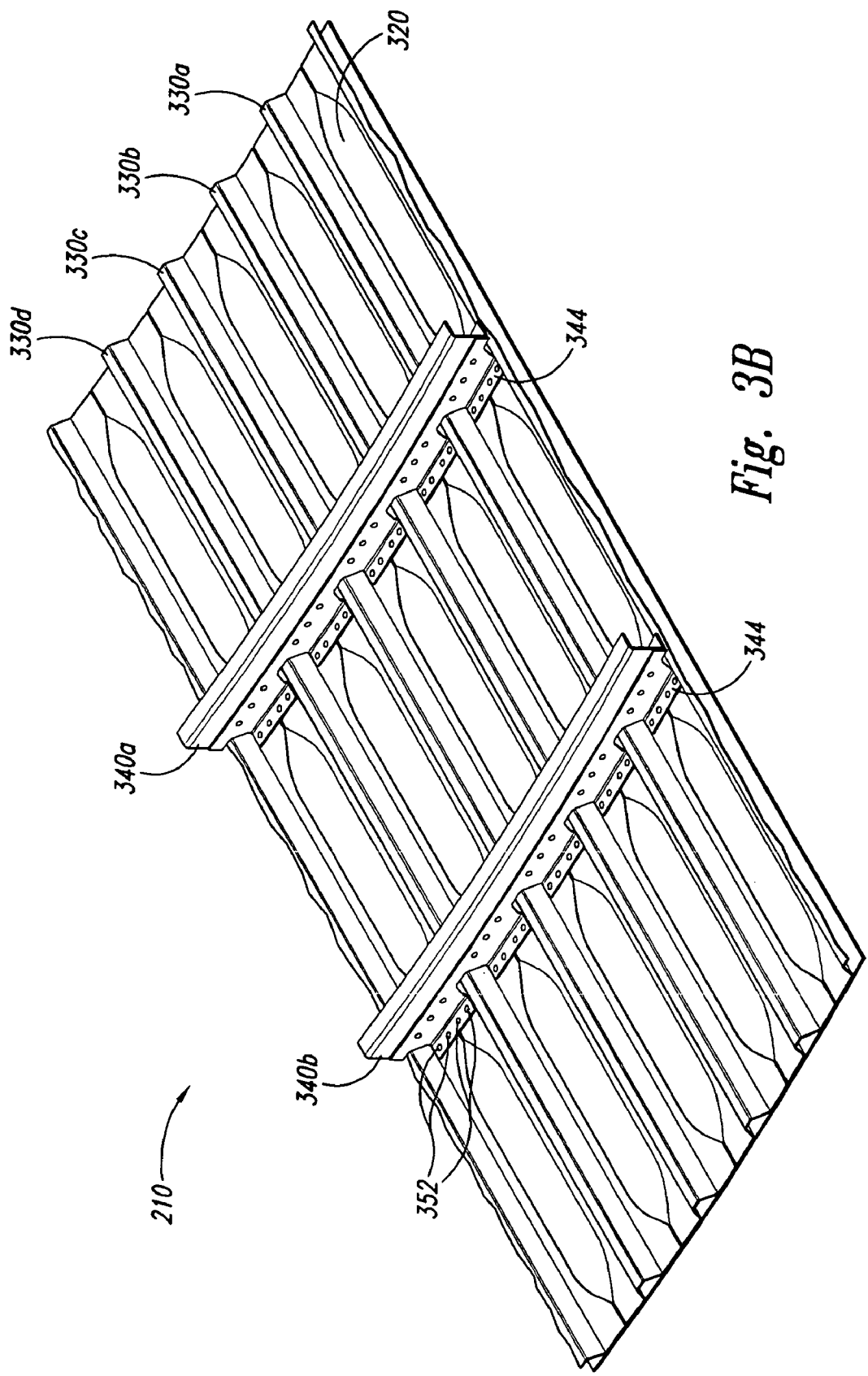

FIGS. 3A and 3B are a partially exploded isometric view and an assembled isometric view, respectively, of the structural panel 210 configured in accordance with an embodiment of the invention. The structural panel 210 is illustrated as a flat panel in FIGS. 3A and 3B for ease of illustration. However, in many embodiments, the structural panel 210 is curved to form part of a cylindrical surface, such as an exterior surface of a fuselage. Referring to FIGS. 3A and 3B together, the structural panel 210 can include a plurality of stiffeners 330 (identified individually as stiffeners 330a–d) attached to a skin 320. Each of the stiffeners 330 can include a raised portion 334 projecting away from the skin 320 and a plurality of flange portions 331 (identified as a plurality of first flange portions 331a extending outwardly from one side of the stiffener 330, and a plurality of second flange portions 331b extending outwardly from the opposite side of the stiffener 330). The flange portions 331 can be mated directly to the skin 320. In the illustrated embodiment, the stiffeners 330 have hat-shaped cross-sections. In other embodiments described below, however, the stiffeners 330 can have other cross-sectional shapes.

The skin 320 and the stiffeners 330 can include composite materials, such as graphite-epoxy materials, and the stiffeners 330 can be adhesively bonded to the skin 320. For example, in one embodiment, the stiffeners 330 can be bonded to the skin 320 during a co-curing process in which the stiffeners 330 and the skin 320 are co-cured at an elevated temperature and pressure. In another embodiment, the stiffeners 330 and the skin 320 can include metallic materials. In this embodiment, the stiffeners 330 can be riveted or otherwise mechanically fastened to the skin 320.

Each of the stiffeners 330 can be positioned on the skin 320 so that the plurality of first flange portions 331a of one stiffener 330 are aligned with the corresponding plurality of second flange portions 331b of an adjacent stiffener 330. For example, each of the first flange portions 331a can include a first outer edge 333a, and each of the second flange portions 331b can include a corresponding second outer edge 333b. In one embodiment, the first outer edge 333a can be spaced apart from the second outer edge 333b by a distance D of about 0.5 inch or less. In another embodiment, the distance D can be about 0.2 inch or less, e.g., about 0.1 inch or less. In yet another embodiment, the stiffeners 330 can be positioned on the skin 320 such that the first flange portions 331a at least approximately contact the second flange portions 331b in which case the distance D is at least approximately zero. By aligning the flange portions 331 in the foregoing manner, the flange portions 331 can form a plurality of at least approximately continuous support surfaces 335 extending between the raised portions 334 of the stiffeners 330.

The structural panel 210 can further include a plurality of support members or frames 340 (identified individually as a first frame 340a and a second frame 340b). In the illustrated embodiment, the frames 340 are two-piece frames that include a first frame section 341 and a second frame section 342. In other embodiments, the structural panel 210 can include other frames composed of more or fewer frame sections.

The first frame section 341 includes a base portion 344 and an upstanding portion 346 projecting away from the base portion 344. The upstanding portion 346 can include a plurality of openings or "mouse holes" 348 through which the raised portions 334 of the stiffeners 330 extend. The base portion 344 can include a plurality of mating surfaces 343 extending between the mouse holes 348. The mating surfaces 343 are configured to contact corresponding ones of the support surfaces 335 extending between the raised portions 334 of the stiffeners 330. The mating surfaces 343 of the illustrated embodiment are absent any joggles between the mouse holes 348 because the corresponding support surfaces 335 to which they mate are at least approximately continuous between the stiffeners 330 and do not include any significant surface steps or misalignments. An advantage of this feature is that it avoids the added costs associated with manufacturing frames with joggles. Such costs may be particularly significant when working with composite materials because, unlike metals that are malleable and can be easily formed, creating joggles or steps in composite surfaces typically requires special tooling and/or post-cure machining.

In one embodiment of the invention, the first frame section 341 can be attached to the structural panel 210 first, and then the second frame section 342 can be attached to the first frame section 341. When attaching the first frame section 341 to the structural panel 210, the base portion 344 of the first frame section 341 is mated to the flange portions 331 of the stiffeners 330 without being mated to the skin 320. That is, the mating surfaces 343 of the base portion 344 contact the support surfaces 335 but not the skin 320. In this manner, the flange portions 331 are effectively sandwiched between the first frame section 341 and the skin 320. In one embodiment, the first frame section 341 can be fastened to the structural panel 210 with a series of suitable fasteners 352. In another embodiment, the base portion 344 can be adhesively bonded directly to the flange portions 331.

After the first frame section 341 has been attached to the structural panel 210, the second frame section 342 can be attached to the upstanding portion 346 of the first frame section 341. In one embodiment, the second frame section 342 can be fastened to the upstanding portion 346 with a series of suitable fasteners 350. In another embodiment, the second frame section 342 can be adhesively bonded to the upstanding portion 346. One advantage of attaching the second frame section 342 to the first frame section 341 after the first frame section 341 has been attached to the structural panel 210 is that the final position of the second frame section 342 can be adjusted to compensate for any misalignment of the first frame section 341 that occurs during attachment. In other embodiments, however, the first frame section 341 can be attached to the second frame section 342 first, and then the frame 340 can be attached to the structural panel 210 as a unit. One advantage of attaching the frame 340 as a unit is that it may be faster than attaching the frame 340 in two stages.

In the illustrated embodiment, the second frame section 342 has a C-shaped cross-section. In other embodiments, the second frame section 342 can have other cross-sectional shapes, such as an L-shaped cross-section. In yet other embodiments, the second frame section 342 can be omitted.

Figure 4A:
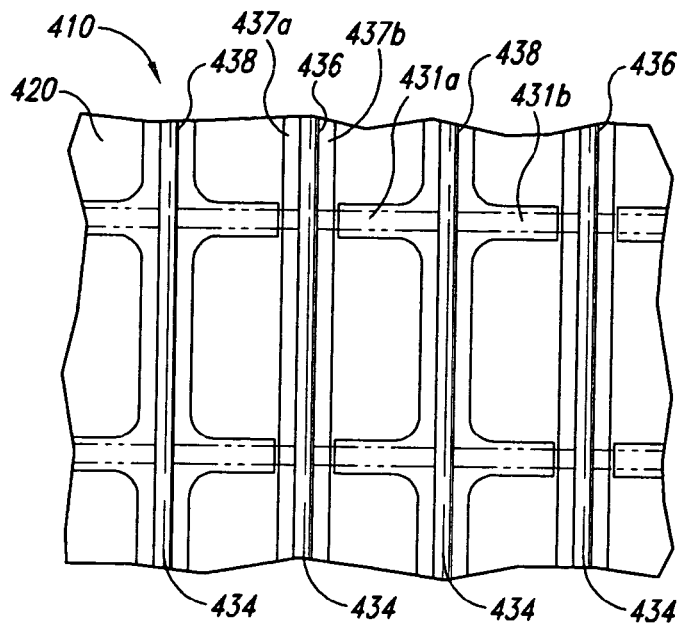
FIGS. 4A and 4B are top and end views, respectively, of a portion of a structural panel configured in accordance with another embodiment of the invention.
Figure 4B:
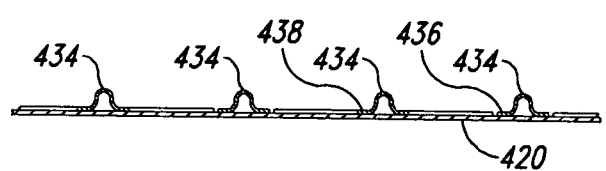

FIGS. 4A and 4B are top and end views, respectively, of a portion of a structural panel 410 configured in accordance with another embodiment of the invention. Referring to FIGS. 4A and 4B together, the structural panel 410 can include a plurality of first stiffeners 436 and a plurality of second stiffeners 438 attached to a skin 420. Each of the stiffeners 436 and 438 can include a raised portion 434 projecting away from the skin 420. Each of the first stiffeners 436 can further include a first flange portion 437a and an opposing second flange portion 437b that are both at least generally straight. Each of the second stiffeners 438, however, can further include a plurality of first flange portions 431a and a plurality of second flange portions 431b that extend outwardly from the raised portion 434 to at least proximate corresponding flange portions 437 of the adjacent first stiffeners 436. A frame (not shown) can mate to the flange portions 431 and 437 as described above with reference to FIGS. 3A and 3B.

Figure 5A:
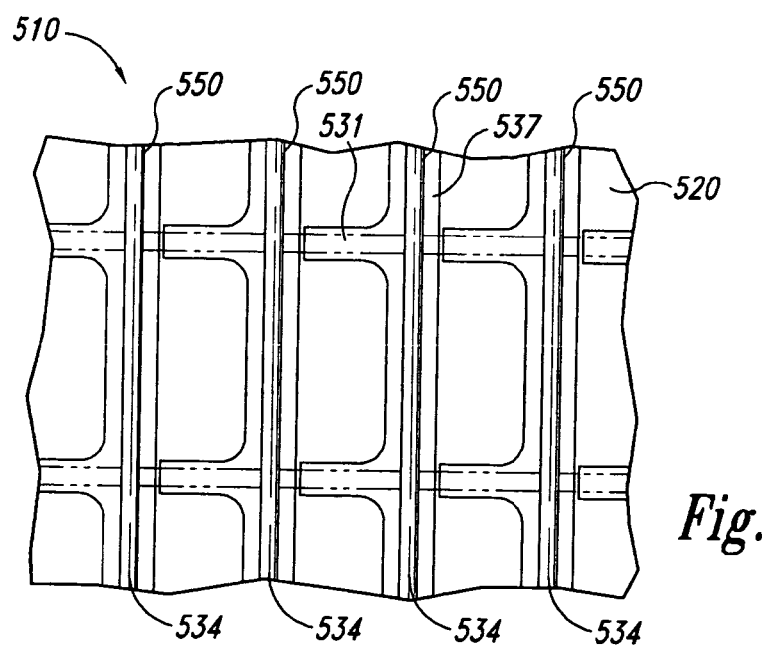
FIGS. 5A and 5B are top and end views, respectively, of a portion of a structural panel configured in accordance with a further embodiment of the invention.
Figure 5B:
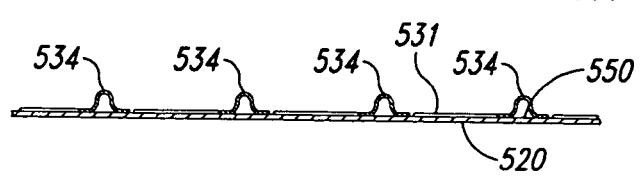

FIGS. 5A and 5B are top and end views, respectively, of a portion of a structural panel 510 configured in accordance with a further embodiment of the invention. Referring to FIGS. 5A and 5B together, in one aspect of this embodiment, the structural panel 510 includes a plurality of asymmetric stiffeners 550 attached to a skin 520. Each of the asymmetric stiffeners 550 can include a plurality of first flange portions 531 extending outwardly from one side of a raised portion 534, and a second flange portion 537 extending outwardly from the opposite side of the raised portion 534. The second flange portion 537 can be at least approximately straight. The first flange portions 531, however, can project outwardly from the raised portion 534 to at least proximate the corresponding second flange portion 537 of the adjacent stiffener 550. A frame (not shown) can mate to the flange portions 531 and 537 as described above with reference to FIGS. 3A and 3B.

FIGS. 6A and 6B are cross-sectional end views of portions of structural panels 610a and 610b, respectively, configured in accordance with further embodiments of the invention. Referring first to FIG. 6A, the structural panel 610a can include a plurality of I-section stiffeners 630a attached to a skin 620a. Each of the I-section stiffeners 630a can include a plurality of first flange portions 631a and a plurality of second flange portions 631b that are at least generally similar in structure and function to the corresponding flange portions 331 described above with reference to FIGS. 3A and 3B. In another aspect of this embodiment, a frame 640a can mate to the flange portions 631 as described above with reference to FIGS. 3A and 3B.

Referring next to FIG. 6B, the structural panel 610b can include a plurality of C-section stiffeners 630b attached to a skin 620b. The C-section stiffeners 630b can include flange portions 631 that are at least generally similar in structure and function to the first flange portions 531 described above with reference to FIGS. 5A and 5B. In another aspect of this embodiment, a frame 640b can mate to the flange portions 631 as described above with reference to FIGS. 3A and 3B.

Various components described herein may be manufactured and/or assembled in accordance with the teachings of copending U.S. Provisional Patent Application No. 60/559,890, entitled "COMPOSITE BARREL SECTIONS FOR AIRCRAFT FUSELAGES AND OTHER STRUCTURES, AND METHODS AND SYSTEMS FOR MANUFACTURING SUCH BARREL SECTIONS," and/or copending U.S. Patent Application No. 60/559,911, entitled "STRUCTURAL PANELS FOR USE IN AIRCRAFT FUSELAGES AND OTHER STRUCTURES," both of which were filed on Apr. 6, 2004, and are incorporated herein in their entireties by reference.

Further, the subject matter of copending U.S. patent application Ser. No. 10/646,509, entitled "MULTIPLE HEAD AUTOMATED COMPOSITE LAMINATING MACHINE FOR THE FABRICATION OF LARGE BARREL SECTION COMPONENTS," filed Aug. 22, 2003; Ser. No. 10/717,030, entitled "METHOD OF TRANSFERRING LARGE UNCURED COMPOSITE LAMINATES," filed Nov. 18, 2003; Ser. No. 10/646,392, entitled "AUTOMATED COMPOSITE LAY-UP TO AN INTERNAL FUSELAGE MANDREL," filed Aug. 22, 2003; Ser. No. 10/630,594, entitled "COMPOSITE FUSELAGE MACHINE," filed Jul. 28, 2003; Ser. No. 10/646,316, entitled "UNIDIRECTIONAL, MULTI-HEAD FIBER PLACEMENT," filed Aug. 22, 2003; Ser. No. 10/301,949, entitled "PARALLEL CONFIGURATION COMPOSITE MATERIAL FABRICATOR," filed Nov. 22, 2002; Ser. No. 10/799,306, entitled "SYSTEMS AND METHODS ENABLING AUTOMATED RETURN TO AND/OR REPAIR OF DEFECTS WITH A MATERIAL PLACEMENT MACHINE," filed Mar. 12, 2004; Ser. No. 10/726,099, entitled "SYSTEMS AND METHODS FOR DETERMINING DEFECT CHARACTERISTICS OF A COMPOSITE STRUCTURE," filed Dec. 2, 2003; Ser. No. 10/628,691, entitled "SYSTEMS AND METHODS FOR IDENTIFYING FOREIGN OBJECTS AND DEBRIS (FOD) AND DEFECTS DURING FABRICATION OF A COMPOSITE STRUCTURE," filed Jul. 28, 2003; and Ser. No. 10/822,538, entitled "SYSTEMS AND METHODS FOR USING LIGHT TO INDICATE DEFECT LOCATIONS ON A COMPOSITE STRUCTURE", filed Apr. 12, 2004, is incorporated herein in its entirety by reference. In addition, the subject matter of U.S. Pat. No. 6,168,358 is also incorporated herein in its entirety by reference.

From the foregoing, it will be appreciated that specific embodiments of the invention have been described herein for purposes of illustration, but that various modifications may be made without deviating from the spirit and scope of the invention. For example, although the various structural panels described above have been described in the context of aircraft structures, in other embodiments, such panels can be used in other applications, such as for land, water, and space vehicles. Accordingly, the invention is not limited, except as by the appended claims.

We claim:

1. A structural panel comprising:
   a skin;
   a first stiffener having a first flange portion mated to the skin and a first raised portion projecting away from the skin, wherein the first flange portion has a first outer edge;
   at least a second stiffener spaced apart from the first stiffener, the second stiffener having a second flange portion mated to the skin and a second raised portion projecting away from the skin, wherein the second flange portion has a second outer edge facing the first outer edge, and wherein at least one of the first flange portion of the first stiffener and the second flange portion of the second stiffener extends toward the other to form an at least approximately continuous support surface extending between the first raised portion of the first stiffener and the second raised portion of the second stiffener; and
   a support member having a base portion mated to the first flange portion of the first stiffener and the second flange portion of the second stiffener without being mated to the skin between the first raised portion of the first stiffener and the second raised portion of the second stiffener.

2. The structural panel of claim 1 wherein the base portion of the support member includes a mating surface absent a joggle, and wherein the mating surface contacts the first flange portion of the first stiffener and the second flange portion of the second stiffener.

3. The structural panel of claim 1 wherein the first outer edge is spaced apart from the second outer edge by a distance of about 0.5 inch or less.

4. The structural panel of claim 1 wherein the first outer edge is spaced apart from the second outer edge by a distance of about 0.2 inch or less.

5. The structural panel of claim 1 wherein the first outer edge is spaced apart from the second outer edge by a distance of about 0.1 inch or less.

6. The structural panel of claim 1 wherein the support member further includes at least first and second openings, and wherein the first raised portion of the first stiffener extends through the first opening and the second raised portion of the second stiffener extends through the second opening.

7. The structural panel of claim 1 wherein the support member is a first frame section that further includes an upstanding portion projecting away from the base portion, and wherein the structural panel further includes a second frame section attached to the upstanding portion of the first frame section.

8. The structural panel of claim 1 wherein the support member is a first frame section that further includes an upstanding portion projecting away from the base portion, and wherein the structural panel further includes a second frame section attached to the upstanding portion of the first frame section, the second frame section having a C-shaped cross-section.

9. The structural panel of claim 1 wherein the first and second stiffeners are at least approximately identical.

10. The structural panel of claim 1 wherein the first and second stiffeners have hat-shaped cross-sections.

11. The structural panel of claim 1 wherein the first and second stiffeners are adhesively bonded to the skin.

12. The structural panel of claim 1 wherein at least the skin and the first and second stiffeners include a composite material.

13. An aircraft fuselage comprising:
    a passenger cabin; and
    a plurality of structural panels operably coupled together to form a portion of the passenger cabin, wherein each of the structural panels includes:
    a skin;
    a first stiffener having a first flange portion mated to the skin and a first raised portion projecting away from the skin, wherein the first flange portion has a first outer edge;
    at least a second stiffener spaced apart from the first stiffener, the second stiffener having a second flange portion mated to the skin and a second raised portion projecting away from the skin, wherein the second flange portion has a second outer edge facing the first outer edge, and wherein at least one of the first flange portion of the first stiffener and the second flange portion of the second stiffener extends toward the other to form an at least approximately continuous support surface extending between the first raised portion of the first stiffener and the second raised portion of the second stiffener; and
    a frame section having a base portion mated to the first flange portion of the first stiffener and the second flange portion of the second stiffener without being mated to the skin between the first raised portion of the first stiffener and the second raised portion of the second stiffener.

14. The aircraft fuselage of claim 13 wherein the plurality of structural panels are operably coupled together to form an exterior portion of the passenger cabin.

15. The aircraft fuselage of claim 13 wherein the skin includes a composite material, and wherein the plurality of structural panels are operably coupled together to form an exterior portion of the passenger cabin.

16. The aircraft fuselage of claim 13, further comprising a plurality of passenger seats positioned in the passenger cabin ranging in number from about 50 seats to about 700 seats.

17. The aircraft fuselage of claim 13, further comprising a plurality of passenger seats positioned in the passenger cabin ranging in number from about 50 seats to about 700 seats, and wherein the skin and stiffeners include composite materials.

18. The aircraft fuselage of claim 13 wherein the plurality of structural panels are operably coupled together to form a floor of the passenger cabin.

19. The structural panel of claim 1 wherein the base portion of the support member is mated to the at least approximately continuous support surface extending between the first raised portion of the first stiffener and the second raised portion of the second stiffener.

20. The aircraft fuselage of claim 13 wherein the base portion of the frame section is mated to the at least approximately continuous support surface extending between the first raised portion of the first stiffener and the second raised portion of the second stiffener.

* * * * *

UNITED STATES PATENT AND TRADEMARK OFFICE
CERTIFICATE OF CORRECTION

PATENT NO. : 7,134,629 B2
APPLICATION NO. : 10/853075
DATED : November 14, 2006
INVENTOR(S) : Johnson et al.

It is certified that error appears in the above-identified patent and that said Letters Patent is hereby corrected as shown below:

Front Page Item (57)
Cited References: The following references were filed June 13, 2006, but were not included in the issued Patent. Please include the following cited references:

| | | |
|---|---|---|
| 6,155,450 | 12/05/2000 | Vasiliev et al. |
| 6,510,961 | 01/28/2003 | Head et al. |
| 6,190,484 | 02/20/2001 | Appa |
| 6,114,050 | 09/05/2000 | Westre et al. |
| 4,463,044 | 07/31/1984 | McKinney |
| 4,448,838 | 05/15/1984 | McClenahan et al. |
| 3,490,983 | 01/1970 | Lee |
| 1,976,257 | 10/1934 | Harper |
| 10/996922 | 05/25/2006 | Michael Chapman |

Raytheon Aircraft's Hawker Horizon Reaches Fuselage Milestone, Raytheon News Release; http://www.beechcraft.de/Press/2000/100900b.htm; [accessed 6/26/2004](2 pages)

Signed and Sealed this

Seventeenth Day of April, 2007

JON W. DUDAS
*Director of the United States Patent and Trademark Office*